Sheet 1.
2 Sheets.

C. M. Spencer

Magazine Fire-arm.

No. 1652. Reissued Apr. 12. 1864.

Witnesses.
E. R. Stansbury.
E. A. Stansbury.

Inventor.
Spencer Rifle Comp.y
By their attorney
Chas. F. Stansbury

C. M. Spencer.

Magazine Fire-arm.

No. 1652. Reissued Apr. 12. 1864.

Witnesses.
E. R. Stansbury
E. A. Stansbury

Spencer Rifle Comp'y
By their attorney
Chas. F. Stansbury

UNITED STATES PATENT OFFICE.

THE SPENCER REPEATING RIFLE COMPANY, OF BOSTON, MASSACHUSETTS, ASSIGNEE, BY MESNE ASSIGNMENTS, OF CHRISTOPHER M. SPENCER, OF SOUTH MANCHESTER, CONNECTICUT.

IMPROVEMENT IN BREECH-LOADING FIRE-ARMS.

Specification forming part of Letters Patent No. 36,062, dated July 29, 1862; Reissue No. 1,652, dated April 12, 1864.

*To all whom it may concern:*

Be it known that CHRISTOPHER M. SPENCER, of South Manchester, in the State of Connecticut, did invent a certain new and useful Improvement in Breech-Loading Fire-Arms; and we do hereby declare the following to be a full and correct description of the same, reference being had to the accompanying drawings, in which—

Figure 1:
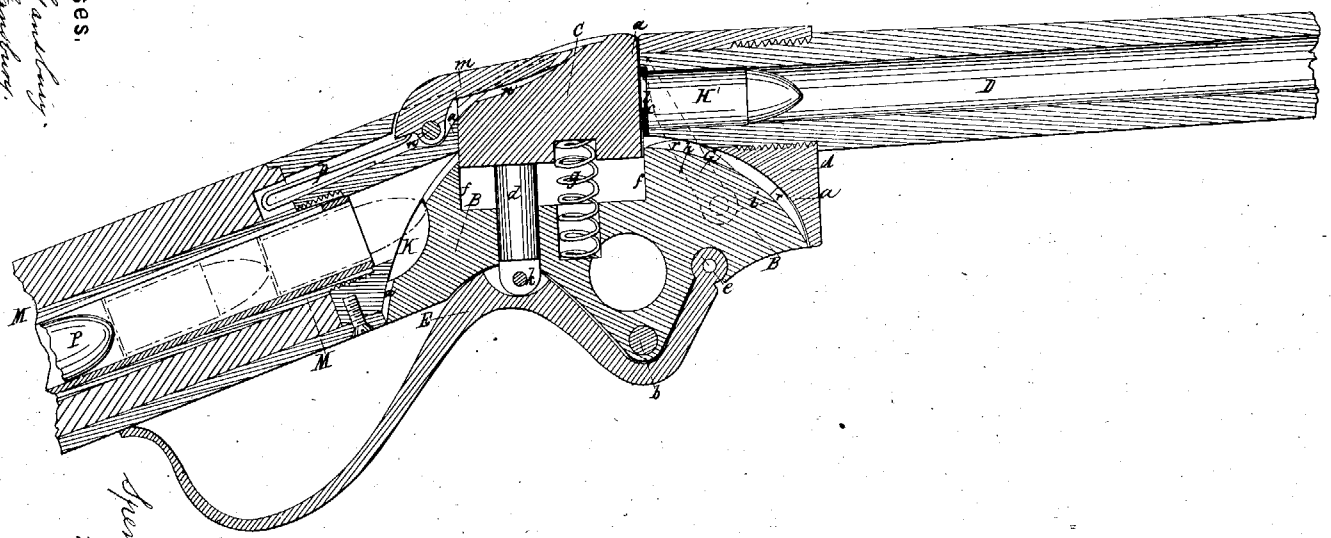
Figure 2:
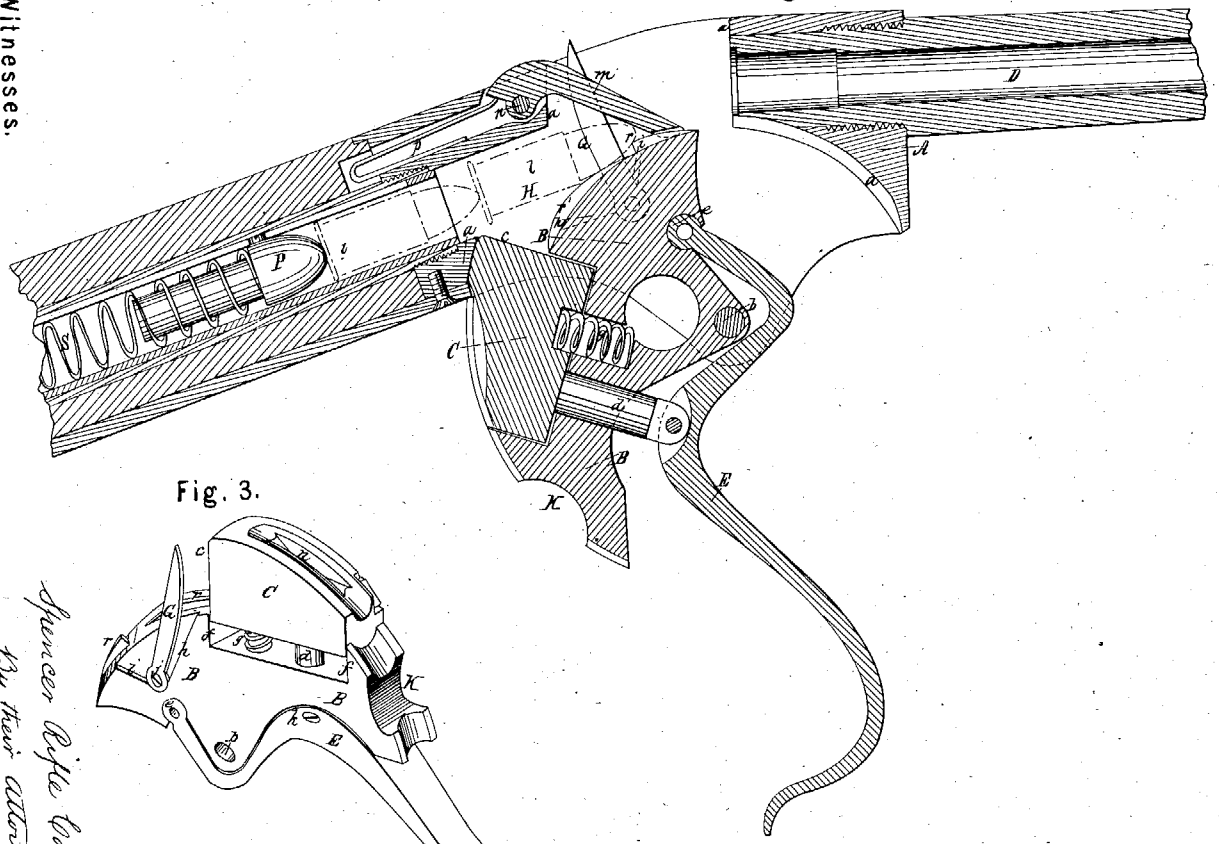
Figure 3:
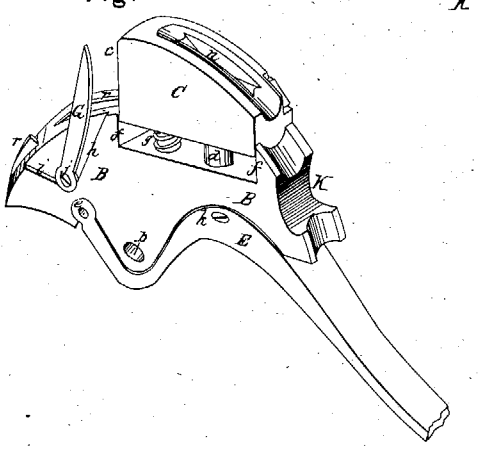

Figure 1 is a vertical longitudinal central section of the rear portion of a breech-loading fire-arm with the improvement of the said SPENCER attached, the piece being represented as loaded and ready to be discharged. Fig. 2 is a similar section, showing the breech thrown open for the discharge of the cartridge-shell and the insertion of a new cartridge. Fig. 3 is a perspective view of the combined rolling and sliding breech separated from the gun.

The same part is marked by the same letter of reference wherever it occurs.

This invention relates to that class of small-arms which load at the breech and in which a flanged metallic cartridge is employed, and applies equally whether the cartridges are inserted singly by hand or are introduced mechanically from a magazine attached to or forming part of the piece, the same arm being capable, without modification or adjustment, of being used either as a self-loader or hand-loader, as may be preferred or as circumstances may require. It is an improvement on the arm patented by the said SPENCER, March 6, 1860, and described in the specification of Letters Patent No. 27,393. It differs from that arm in the compound character of the breech, in the mode of locking it, and in the device for withdrawing the cases of the exploded cartridges from the chamber of the barrel.

The nature of this invention consists in so combining a rolling with a sliding breech that both shall be actuated by the same mechanism, and that the sliding portion shall serve the treble purpose of, first, receiving the cartridge either from the hand or magazine and guiding and pressing it into the chamber; second, locking the breech; and, third, forming the face of the breech, said compound breech being operated by the upward and downward movement of the guard-lever.

It further consists in an improved arrangement and mode of operating the lever for withdrawing the shells of the exploded cartridges from the chamber, all substantially as hereinafter described and shown.

To enable others skilled in the art to make and use my invention, I will proceed to describe its construction and operation, referring to the drawings, whereon—

A marks the breech-holder or frame, which receives the compound breech B C, and connects the barrel D to the stock. The compound breech B C works in a parallel-sided slot, *a a*, in the breech-frame A.

The compound breech consists mainly of two parts, B and C, of which part B has a rotary motion on its center-pin *b*, which passes transversely through the frame, and the part C has a sliding up-and-down movement in a recess, *f f*, in the piece B, and also partakes of the rolling movement of B, forming part of the same system with it. The piece C is impelled upward by the spiral spring *g*, and it is drawn down by means of the rod *d*, which, after passing through a hole in the piece B, is pivoted to the guard-lever E at *k*. This piece C, when at its highest point, as in Fig. 1, locks the breech securely in place by passing into the upper portion of the slot *a a*. Its front surface, *c c*, coming into close contact with the rear end of the barrel, forms the face of the breech.

The guard-lever E is connected to the piece B by a knuckle-joint, *e*, and is pivoted to the rod *d* at *k*, a point in rear of the pin *b*. By depressing the guard-lever, the first effect is to draw down the slide C out of the position shown in Fig. 1 until it descends far enough into the recess *f f* to unlock the breech, when a continuation of the same downward movement of the guard-lever rotates the breech on its center *b* and opens it till the parts assume the position shown in Fig. 2, when further downward movement is stopped by the highest part of slide C coming in contact with the frame, as shown.

When in this position the piece will receive a cartridge from the magazine M in the stock, said cartridge being forced forward by a plug or piston, P, operated by a spiral spring, S, which throws it out of the magazine into the position shown by H, in red lines in Fig. 2, its rear end or base resting against the point of the succeeding cartridge or of the plug P, and its forward end being held between the tongue *m* and the projection *r*, and so that, as the guard-lever is raised, the cartridge will be carried forward by the radial face *c* of the slide C, and pressed into the chamber of the piece, occupying the position shown by H′ in Fig. 1. When the cartridge is completely inserted in the chamber, the face *c* of the slide C is in line and in contact with the rear end of the barrel, and in such a position with reference to the upper part of the slot *a a* that it rises in obedience to the impulse of the spring *g*, thus locking the breech, closing the barrel, and forming the face of the breech. By reason of the connection between the slide C and the trigger-guard E the upward movement of the slide draws the guard up into close contact with the stock, as shown in Fig. 1, and for the same reason, if the spring should fail to perform its duty, the slide C might be raised by the guard-lever.

When the piece is to be loaded by hand the guard-lever is raised till the upper angle of the slide C touches the tongue *m*, when the lever G can be pushed forward by a touch of the finger so that it will be in advance of the flange of the cartridge and in the proper position to withdraw the shell when the guard-lever is depressed.

There is a groove, *n*, in the top of the slide C, in which is received and guided the free end of the forked tongue *m*, which is pressed downward upon the breech by the operation of spring *p*. There are also projections *r* on the circular part of piece B, which enter corresponding recesses in the free end of tongue *m*. This tongue serves a double purpose; it assists in guiding the cartridge from the magazine into the chamber, preventing it from falling out or being thrown out at the upper opening of the slot *a a* in any position of the piece, and it guides the shell of the exploded cartridge, as it is retracted from the chamber, so as to insure its being thrown out at the top of the slot and prevent its falling backward toward the magazine and becoming entangled in the breech.

The projections *r r′* on the circular part of piece B assist in controlling the movements of the cartridge as it passes from the magazine to the breech. The forward projection, *r*, prevents the cartridge from being pressed too far forward by the spring in the magazine, and the rearward one, *r′*, raises and supports the cartridge in a line with the bore of the barrel, thus insuring its entering the chamber without jamming. When the breech is closed the point of the forward cartridge in the magazine rests in a notch or recess, K, cut in the piece B to receive it, the object of said recess being to prevent the ball from being pushed forward upon the periphery of the piece B so as to become wedged into the space above that piece and obstruct the operation of the breech.

The arrangement of the lever G for throwing out the cases of exploded cartridges is one of the peculiar features of this invention. That lever consists of a thin piece of metal, of the shape represented, pivoted at *j* to the piece B, (see Fig. 3,) and let into a recess, *h i*, in the side of said piece. It is free to vibrate on its pivot *j*, its motion in either direction being stopped by the walls *h* and *i* of the recess, or by pins if preferred, the recess in the latter case being of greater width. When the breech is closed the lever G occupies the position shown in dotted lines in Fig. 1. It then lies in a notch cut to receive it in the frame and barrel. It is carried into said notch by the rear wall *h* of the recess coming into contact with it as the breech is closed, and it enters just far enough to allow room for the flange of the cartridge to lie between it and the face of the slide C, as shown in Fig. 1.

As the breech is rolling back at the commencement of its opening movement the friction of the cartridge-case against the sides of the chamber tends to hold back the upper end of lever G, while its lower end is rapidly carried backward by reason of its attachment to piece B. The effect of this is that the cartridge-case is but slowly forced back at the beginning of the movement, allowing time for the tongue *m* to descend to the position shown in Fig. 2 before the cartridge-case is entirely withdrawn from the chamber. When the front wall *i* of the recess comes in contact with lever G the cartridge-case is quickly and forcibly drawn out of the chamber and moved up along the tongue *m* until it is discharged at the top of the slot *a a*.

In closing the breech to reload the arm, the lever G is carried back to its original position in the notch by the flange of the loaded cartridge when the loading is done from the magazine. The same movement is readily effected by hand when from any cause that mode of loading is resorted to.

Having thus fully described the said invention, what is claimed and desired to be secured by Letters Patent, is—

1. The compound breech, consisting of the pieces B and C, constructed, operated, and operating substantially in the manner described.

2. The combination, with the compound breech B C, of the guard-lever G, substantially in the manner and for the purpose set forth.

3. The lever G, arranged and operated substantially as described.

The above specification of the said invention signed and witnessed at Boston, this 12th day of December, A. D. 1863.

SPENCER REPEATING RIFLE CO.
By WARREN FISHER, Jr., *Treas.*

Witnesses:
CHAUNCEY SMITH,
H. FARNAM SMITH.